March 8, 1927.
H. V. LUDWICK
1,620,265
BRAKE APPLYING MECHANISM FOR MOTOR VEHICLES
Filed May 24, 1923      2 Sheets-Sheet 1
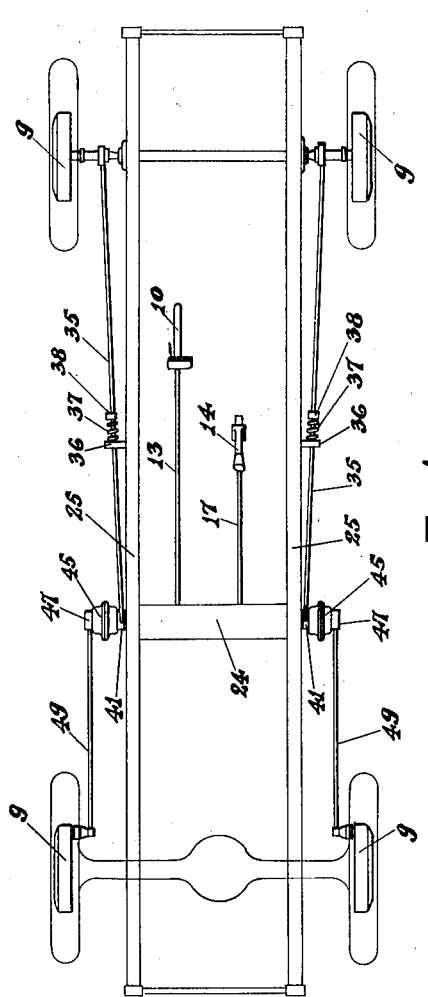
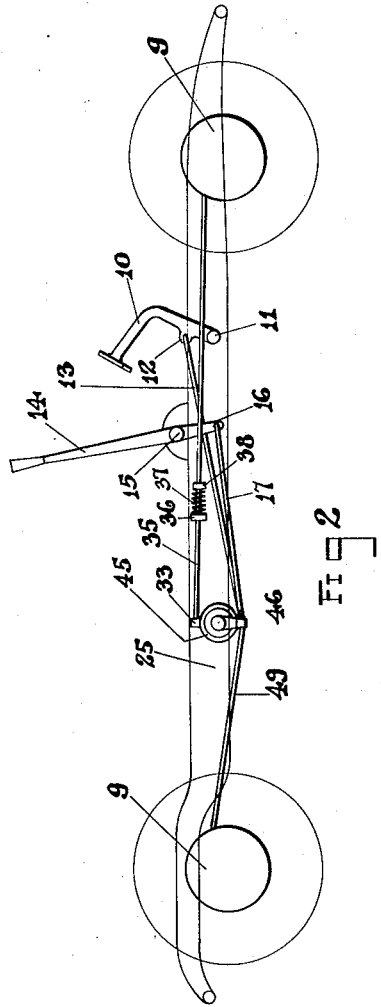
WITNESS:—
Walter M. Trout.
INVENTOR.
HERBERT V. LUDWICK.
BY
ATTORNEY March 8, 1927.

H. V. LUDWICK 1,620,265

BRAKE APPLYING MECHANISM FOR MOTOR VEHICLES

Filed May 24, 1923    2 Sheets-Sheet 2

WITNESS:—
Walter M. Sprout.

INVENTOR.
HERBERT V. LUDWICK.
BY C. B. Des Jardins
ATTORNEY

Patented Mar. 8, 1927.

1,620,265

UNITED STATES PATENT OFFICE.

HERBERT V. LUDWICK, OF PHILADELPHIA, PENNSYLVANIA, ASSIGNOR TO BUDD WHEEL COMPANY, OF PHILADELPHIA, PENNSYLVANIA, A CORPORATION OF PENNSYLVANIA.

BRAKE-APPLYING MECHANISM FOR MOTOR VEHICLES.

Application filed May 24, 1923. Serial No. 641,109.

My invention relates to improvements in brake-applying mechanism for motor vehicles and it has to do, more particularly, with mechanism for applying brakes on all four wheels of a motor vehicle.

The chief object of my invention is to provide a simple and efficient mechanism connecting a brake lever and brakes acting on the four wheels of a motor vehicle, by means of which all four brakes can be applied quickly, easily and equally, regardless of differences in the adjustments of the several brakes. In other words, the object of my invention is to provide an improved brake-applying and equalizing mechanism for four-wheel brakes, which is particularly simple, inexpensive in construction and effective in operation.

Further objects, and objects relating to details and economies of operation and construction will definitely appear from the detailed description to follow. I accomplish the objects of my invention, in one instance, by the devices and means described in the following specification. My invention is clearly defined and pointed out in the appended claims. A structure constituting a preferred embodiment of my invention is illustrated in the accompanying drawing, forming a part of this specification, in which:

Fig. 1 is a plan view of the chassis of a motor vehicle having a brake-applying mechanism embodying my invention.

Fig. 2 is a side view of the same.

Fig. 3 is a plan view, on an enlarged scale, of the central portion of said mechanism, one of the frame cross members being removed to show the brake-operating shaft.

In the drawings, the same reference numerals refer to the same parts throughout the several views, and the sectional view is taken looking in the direction of the arrows at the ends of the section line.

Figure 4:
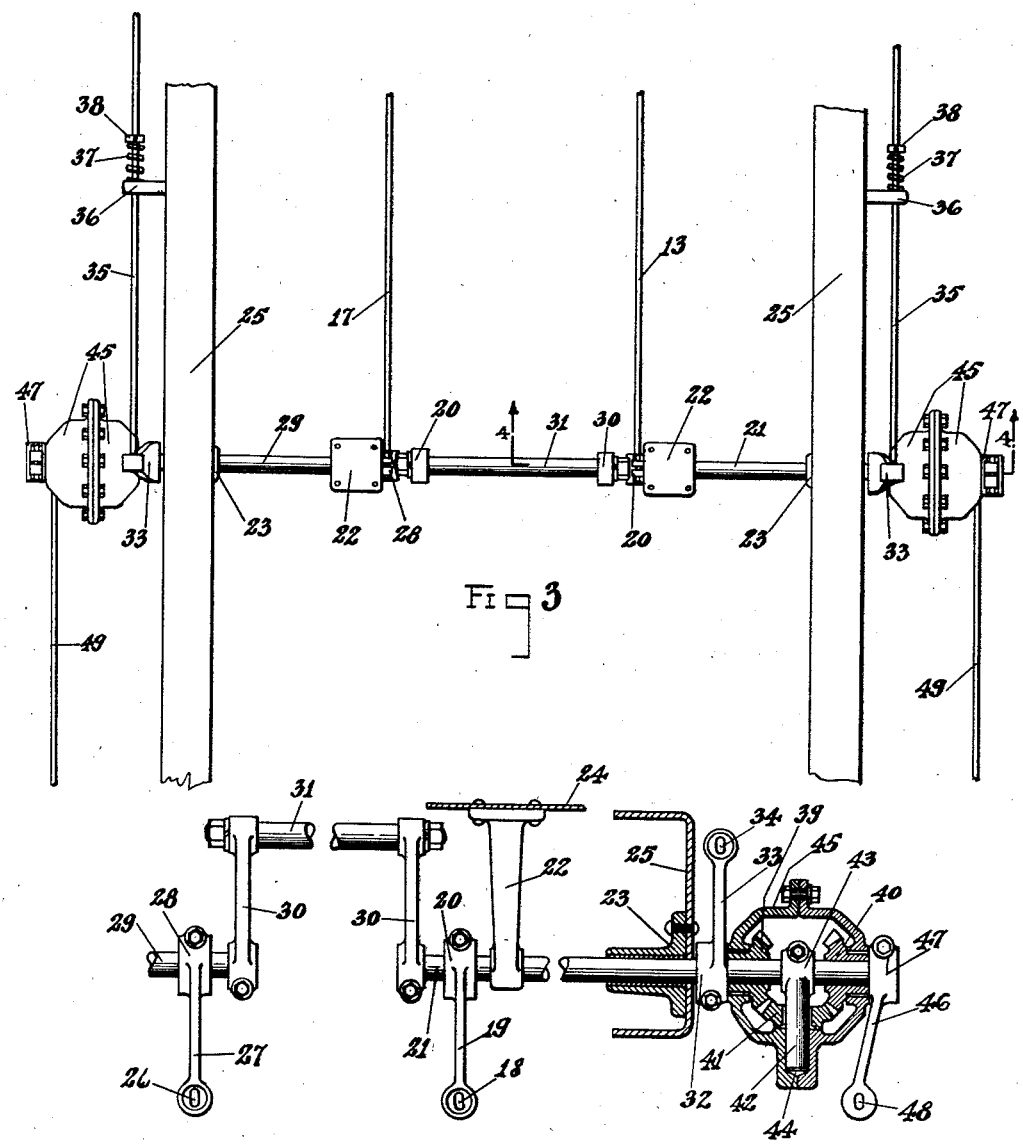
Fig. 4 is an enlarged, fragmentary, sectional view, taken on the line 4—4 of Fig. 3.

I propose to accomplish the objects of my invention by providing a brake-operating shaft which is journaled on the chassis frame and connected with the brake lever or levers so that it may be rotated thereby. A movement of the brake lever or levers is communicated from this shaft to the respective front and rear wheel brakes through differential gearing units so that, if the brakes on one of the wheels are so adjusted that they are tight before the brakes on the other wheels have taken hold, the brake-operating shaft and parts connected therewith may still move so as to set all the brakes.

I also propose to use a brake-operating shaft having a central, crank-like offset. This has sufficient give or yield, under torque, to equalize the braking on opposite sides of the vehicle. By these means, the brakes are applied equally on all four wheels and unequal braking, which often leads to skidding and serious accidents, is eliminated.

In the accompanying drawings, I have illustrated an embodiment of this invention which has proven very satisfactory in use. Referring to the numbered parts of such drawings, it will be seen that all four wheels of the motor vehicle are equipped with brakes, which are shown diagrammatically and indicated by the reference numeral, 9. These brakes may be of any suitable construction and may be of either the internal or external type. A foot lever, 10, is pivoted, at 11, on the frame of the motor vehicle and has a lug, 12, to which the forward end of the brake rod, 13, is connected. I have also shown a hand lever, 14, which is pivoted, at 15, on the motor vehicle frame. The forward end of a brake rod, 17, is connected, at 16, to the lower end of this hand lever. The brakes may be applied by actuating either the foot lever or the hand lever. The rear end of the brake rod, 13, extends through an eye, 18, in an arm, 19, having at its opposite end a boss, 20, through which the shaft section, 21, extends and to which said shaft section is rigidly fastened. A nut may be screwed upon the extreme rear end of the brake rod, 13, and engage the end of the arm, 19, to form an adjustable connection between the brake rod, 13, and the arm, 19. The shaft section, 21, is journaled in a bearing, 23, carried by one of the side members, 25, of the motor vehicle frame, and in a hanger, 22, carried by a cross member, 24, of such frame. A similar shaft section, 29, is journaled in a similar bearing and hanger on the opposite side of the motor vehicle frame, and this shaft section, 29, extends through the boss, 28, of arm, 27, and is rigidly fastened thereto. The arm, 27, has an eye, 26, at its lower end, through which the rear end of the brake rod, 17, extends and with which such brake rod is adjustably connected in the manner described with reference to the brake rod, 13, and the arm, 19. Crank arms, 30, are secured to the inner ends of the shaft sections, 21 and 29, and the free ends of such crank arms are connected by a rod, 31. The shaft sections, 21 and 29, arms, 30, and rod, 31, together form a brake-operating shaft journaled in the frame and having a crank-like offset in its central portion. It will be seen that this brake-operating shaft is caused to turn in its bearings whenever either the foot lever, 10, or the hand lever, 14, is actuated.

Upon the outer ends of these shaft sections, 21 and 29, differential gearing units are mounted, through which the brake-operating shaft is connected with the respective wheel brakes at the front and rear of the motor vehicle. In this instance, it has been found convenient to locate these differential gearing units on the outside of the motor vehicle frame, as shown in Fig. 3. These differential gearing units are the same at both ends of the brake-operating shaft. The construction is very clearly shown in Fig. 4. Bevel pinions, 39 and 40, are journaled on the ends of the shaft sections, 21, and these pinions mesh with a bevel pinion, 41, which is journaled on an arm, 42, having the boss, 43, through which the shaft section, 21, extends and by means of which the arm, 42, is rigidly secured to such shaft section. The arm, 42, extends through the bore of the bevel pinion, 41, and fits in a socket, 44, formed in a differential casing, which, in this case, is made up of two casing members, 45, detachably connected together and housing and surrounding the pinions, 39, 40 and 41. These casing members, 45, are provided with aligned openings through which the shaft section, 21, extends and in which the hubs of the pinions, 39 and 40, are journaled. These hubs extend outside of the casing and are connected to arms having suitable connections with the front and rear brakes on that side of the vehicle. The outer end of the arm, 33, has an eye, 34, through which the rear end of a brake rod, 35, extends. A nut may be screwed on the rear end of this brake rod, forming an adjustable connection between this brake rod and the arm, 33. The rod, 35, may pass through a bracket, 36, carried by the frame of the motor vehicle and, in order to restore the brake to normal position, I may use a spring, 37, on the rod, 35, compressed between the bracket, 36, and a collar, 38, fixed on the rod, 35. The forward end of the rod, 35, is connected to the brake mechanism operating on the front wheel on that side of the vehicle. The connection between the brake rod, 35, and such braking mechanism forms no part of my invention and, therefore, I do not deem it necessary to illustrate or describe it herein.

The boss, 47, of an arm, 46, is mounted on and rigidly secured to the extending hub of the pinion, 40. An eye, 48, is provided in the lower end of the arm, 46, through which the forward end of a brake rod, 49, extends and to which said brake rod may be adjustably connected by a nut screwed on the end thereof. The rear end of the brake rod, 49, is connected with the braking mechanism acting on the rear wheel on that side of the vehicle.

When the operator actuates either the foot lever, 10, or the hand lever, 14, the brake-operating shaft, made up of the shaft sections, 21 and 29, and the crank-like offset connecting them, is caused to turn. The arm, 42, is fastened to the said shaft and, therefore, it turns with it, carrying with it the pinion, 41, and the differential casing. This causes the pinions, 39 and 40, to rotate on the shaft section so as to move the brake rods, 45 and 49, in the proper direction to apply the brakes. In case the brakes on the front and rear wheels should be unequally adjusted, so that a movement of the brake rod, 35, sufficient to set the brakes on the front wheel, is not sufficient to apply the brakes on the rear wheel, the differential gearing permits the pinion, 40, and the arm, 46, carried thereby, to continue to rotate after the pinion, 39, and the arm, 33, are held fast because the front wheel brake has been set. The same action would take place if the rear wheel brake was set before the front wheel brake has been applied. This provides an equalizing action between the front and rear brakes on the same side of the vehicle, so that they will both be set equally by the same movement of the brake lever. Since there are differential gearing units at both ends of the brake-operating shaft, these will take care of the equalizing of the front and rear brakes on both sides of the motor vehicle. The crank-like offset in the brake-operating shaft formed by the arms, 30, and the rod, 31, connecting the shaft sections, 21 and 29, has an important function in equalizing the braking action on opposite sides of the vehicle, since this crank-like offset provides enough spring and yields enough, under torque, to equalize the braking action on opposite sides of the vehicle and permit a continued rotation of the brake shaft, to set the brakes on one side, after the brakes on the other side have been fully set.

I am aware that the particular embodiment of my invention, which I have illustrated in the drawings and described in this specification, may be varied considerably without departing from the spirit of my invention and, therefore, I claim my invention broadly, as indicated by the appended claims.

Having thus described my invention, what I claim as new and useful and desire to secure by Letters Patent is—

1. Brake-applying mechanism for motor vehicles comprising four-wheel brakes, a brake lever for simultaneously operating all of said brakes, flexible connections between the brakes on opposite sides of the vehicle, and connections including differential gearing between the brakes on the same side of the vehicle.

2. Brake-applying mechanism for motor vehicles comprising the combination with front and rear wheel brakes, of a countershaft, connections between said countershaft and a brake-operating lever, and a pair of arms journaled on and actuated by said countershaft through differential gearing, said arms being connected to actuate the front and rear brakes on the same side of the vehicle.

3. Brake-applying mechanism for motor vehicles having the usual frame, said mechanism comprising front and rear wheel brakes and a transversely extending brake operating shaft journaled in the frame and having its end projecting outside of the same, a differential gearing unit mounted on and actuated by the projecting end of said shaft, and connections between said differential gearing unit and the front and rear wheel brakes on that side of the vehicle.

4. Brake-applying mechanism for motor vehicles comprising the combination with front and rear wheel brakes, of a brake-operating shaft, means for actuating said shaft, and a pair of differential gearing units connected to said shaft and actuated thereby, one of said units being connected to the brakes on one side of the vehicle and the other to the brakes on the other side of the vehicle.

5. Brake-applying mechanism for motor vehicles comprising the combination with front and rear wheel brakes, of a brake-operating shaft, means for actuating said shaft, and a pair of differential gearing units mounted on opposite ends of said shaft, each of said units being connected to the brakes on the same side of the motor vehicle.

6. Brake-applying mechanism for motor vehicles comprising the combination with front and rear wheel brakes, of a brake-operating shaft, means for actuating said shaft, a pair of differential gearing units mounted on said shaft, each of said units comprising a pair of pinions journaled on the shaft, a connection between each pinion and one of the brakes on the same side of the vehicle, an arm fixed to rotate with the shaft, and a pinion journaled on said arm and meshing with the pinions on said shaft.

7. Brake-applying mechanism for motor vehicles comprising the combination with front and rear wheel brakes, of a brake-operating shaft, means for actuating said shaft, a pair of differential gearing units mounted on opposite ends of said shaft, each of said units including an arm fixed to rotate with the shaft, a pinion journaled on said arm, a pair of pinions journaled on said shaft and meshing with the pinion on said arm, an arm secured to each of the pinions on the shaft, and brake rods connected to said arms and to the brakes on the same side of the motor vehicle.

8. Brake-applying mechanism for motor vehicles comprising a brake lever, a plurality of wheel brakes, a brake-operating shaft having a central, crank-like offset, connections between said brake lever and said shaft, and connections between the ends of said shafts and said brakes.

9. Brake-applying mechanism for motor vehicles comprising the combination with a plurality of wheel brakes, of a brake-operating shaft journaled on the frame of the motor vehicle and comprising a pair of shaft sections connected by a crank-like off-set portion, a pair of brake levers, connections between said brake levers and said shaft, said brake levers being connected to said shaft sections on opposite sides of the crank-like offset, and connections between the ends of said shaft and the wheel brakes.

10. Brake-applying mechanism for motor vehicles comprising the combination with front and rear wheel brakes of a brake-operating shaft having a central crank-like offset, means for actuating said shaft, and connections between the ends of said shaft and the front and rear wheel brakes on the same side of the vehicle.

11. Brake-applying mechanism for motor vehicles comprising the combination with front and rear wheel brakes of a brake-operating shaft having a central crank-like offset, differential gearing units connected to and actuated by the ends of said shaft and connections between such differential gearing units and the front and rear wheel brakes on the same side of the motor vehicle.

12. Brake-applying mechanism for motor vehicles comprising four-wheel brakes, a transversely extending brake-operating shaft comprising a pair of flexibly connected sections, a brake lever connected to one of said sections, a differential gearing unit connected to and actuated by each shaft section, and connections between each such differential gearing unit and the front and rear wheel brakes on one side of the vehicle.

13. In brake-applying mechanism for motor vehicles, the combination with a pair of wheel brakes, of a brake-operating shaft divided into separate sections, each of said sections being separately journalled in the vehicle frame, and adapted to actuate one of the brakes, an operating lever connected to each of said shaft sections, and connections between the shaft sections whereby both brakes may be applied upon actuation of either one of the operating levers, said connections permitting relative angular displacement of said shaft sections and thus serving as an equalizing means between the pair of brakes.

In testimony whereof, I affix my signature.

HERBERT V. LUDWICK.